May 26, 1970 R. L. HERRMANN 3,514,637
CONTROL APPARATUS
Filed Dec. 27, 1967 2 Sheets-Sheet 1

INVENTOR.
ROBERT L. HERRMANN
BY Charles J. Ungemach
ATTORNEY

INVENTOR.
ROBERT L. HERRMANN
BY Charles J. Ungemach
ATTORNEY 3,514,637
Patented May 26, 1970

3,514,637

CONTROL APPARATUS

Robert L. Herrmann, New Brighton, Minn., assignor to Honeywell Inc., Minneapolis, Minn., a corporation of Delaware Filed Dec. 27, 1967, Ser. No. 693,843
Int. Cl. H03k *17/00*
U.S. Cl. 307—254 9 Claims

ABSTRACT OF THE DISCLOSURE

An electronic switch responsive to control pulses to switch an A-C signal in such a way that voltage steps or spikes are not produced at the output during switching.

FIELD OF THE INVENTION

The invention pertains to the field of electronic switches and especially to switches in which the switching proceeds in response to a series of control pulses and switching occurs at points in the input signal such that transients in the output are avoided.

SUMMARY

The invention is an A-C electronic switch circuit which is operated by a series of control pulses. The switch has two states. In one state the switch passes an input signal and in the other state it blocks it. Regardless of its state, the switch presents a constant load to the input signal source and has a low output impedance. The switch comprises two transistors with emitters and collectors tied together, each transistor used in an emitter-follower configuration. At any given time one of the two transistors is nonconducting and the other is conducting and controlling the emitter-follower operation. This emitter-follower configuration is used as the output stage of the switch circuit with one transistor in control during the off state of the switch circuit and the other in control during the on state. The remainder of the circuit controls the application of signals to the bases of these two transistors such that there is a smooth transition from one state to the other without transient producing voltage steps in the output.

BRIEF DESCRIPTION OF THE DRAWINGS

FIG. 4 shows the output waveform of the electronic switch when it is turned on.

DESCRIPTION

Figure 1:
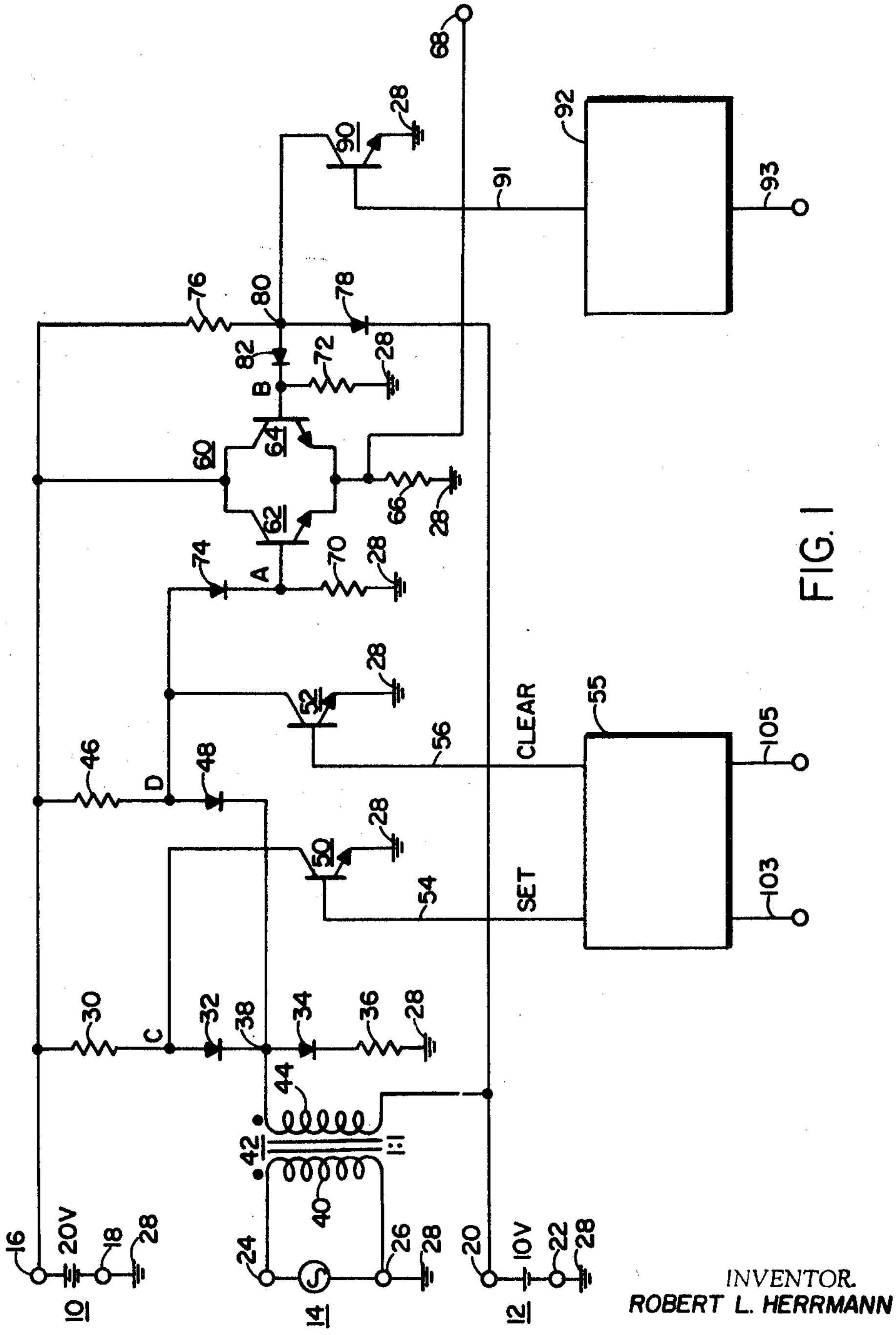
FIG. 1 is a schematic diagram of an A-C electronic switch circuit.

The switch of FIG. 1 includes three voltage sources, a first D-C supply source 10, a second D-C bias source 12, and an A-C input signal source 14. Source 10 has a positive terminal 16 and a negative terminal 18. Source 12 has a positive terminal 20 and a negative terminal 22. A-C source 14 has terminals 24 and 26. Terminals 18, 26, and 22 of sources 10, 14 and 12, respectively, are connected to ground 28. It will be assumed that the potential of source 10 is 20 volts and the potential of source 12 is 10 volts. These particular potentials are merely examples and other potentials could just as well have been chosen. It is only necessary that the potential of source 12 be one half of that of source 10 to allow maximum swing of the A-C input signal. A series circuit comprising a resistor 30, a diode 32, a diode 34, and a resistor 36 is connected from the positive terminal 16 of source 10 to ground 28. As connected, the diodes 32 and 34 are forward biased and current can flow from positive terminal 16 of source 10, through resistor 30 to diode 32, through diode 32 to diode 34, through diode 34 to resistor 36, and through resistor 36 to ground 28. A node 38 is common to diodes 32 and 34. A node C is common to resistor 30 and diode 32. The resistance of resistor 30 is equal to that of resistor 36 and the forward resistance of diode 32 is equal to that of diode 34, thus the D-C potential at node 38 is one half of that of source 10, or, in this particuular case, +10 volts.

The primary winding 40 of the a transformer 42 is connected across terminals 24 and 26 of A-C source 14. The secondary winding 44 of transformer 42 is connected between node 38 and the positive terminal 20 of D-C source 12. Transformer 42 has a turns ratio of one to one. In this way the A-C signal generated by source 14 is superimposed on the +10 volt D-C voltage present at node 38.

Connected between positive terminal 16 of source 10 and node 38 is a series circuit comprising a resistor 46 and a diode 48. Diode 48 is connected such that it is forward biased and current can flow from the positive terminal 16 of source 10 through resistor 46 to diode 48 and through diode 48 to node 38. A node D is common to resistor 46 and diode 48. The resistance of resistor 46 is equal to that of resistors 30 and 36 and the forward resistance of diode 48 is equal to that of diodes 32 and 34.

The collector of a transistor 50 is connected to node C and the collector of a transistor 52 is connected to node D. The emitters of transistors 50 and 52 are connected to ground 28. The base of transistor 50 is connected to and driven by the SET output line 54 of a flip-flop 55. The base of transistor 52 is connected to and driven by the CLEAR output line 56 of flip-flop 55. At any given time, one of the transistors 50 or 52 is turned on into saturation and the other is turned off. The current which flows through diode 34 is supplied through either diode 32 or diode 48 depending upon the state of flip-flop 55, which is driving either transistor 50 or 52. Diode 34 balances out the forward drop of diode 32 or diode 48 to maintain little or no D-C current in the secondary winding 44 of transformer 42. Node D is above the potential of node 38 by an amount equal to the D-C drop across diode 48 if transistor 52 is off, or approximately at zero volts if transistor 52 is turned on.

A switching means 60 comprises two transistors 62 and 64. Each transistor has collector, base, and emitter electrodes. The collectors of both transistors 62 and 64 are connected to the positive terminal 16 of supply source 10. The emitters of transistors 62 and 64 are tied together and connected to one end of a resistor 66, the other end of which is tied to ground 28. The output signal developed by the switch appears at an output terminal 68 which is connected to the emitters of transistors 62 and 64. The base of transistor 62 is connected to a junction A and the base of transistor 64 is connected to a junction B.

These junctions serve as signal input means of the switching means 60. Resistors 70 and 72 are connected from junctions A and B respectively to ground 28. A diode 74 is connected between junctions D and A such that it is forward biased when junction D is positive with respect to junction A. A series circuit comprising a resistor 76 and a diode 78 is connected between the positive terminal 16 of source 10 and the positive terminal 20 of source 12. Current can flow from the positive terminal 16 of the 20 volt source 10 to resistor 76, through resistor 76 to a junction 80 which is common to resistor 76 and diode 78, to diode 78, and through diode 78, which is forward biased, to positive terminal 20 of the 10 volt source 12. A diode 82 is connected between junction 80 and junction B such that it is forward biased when junction 80 is positive with respect to junction B.

A transistor 90 having collector, base, and emitter electrodes is used to control the potential at junction 80. The collector of transistor 90 is tied to junction 80 and the emitter is tied to ground 28. The base of transistor 90 is connected to an output line 91 of a control logic circuit 92. For example, circuit 92 can be a flip-flop. The state of flip-flop 92 causes a signal to be developed on its output line 91 which either causes transistor 90 to conduct or be cut off. If transistor 90 is conducting, junction 80 is maintained at about ground potential. If transistor 90 is cut off and not conducting, the potential at junction 80 is +10 volts D-C plus the D-C voltage drop across diode 78. A typical diode such as diode 78 has a voltage drop of 0.6 volt and therefore the D-C potential at junction 80 would be about +10.6 volts.

Diode 74 balances out the forward drop of diode 48 so that the base of transistor 62, connected to junction A, is switched between zero volts and plus 10 volts D-C with the A-C signal superimposed thereon. The base of transistor 62, connected to junction B, is switched between zero volts and +10 volts D-C by the action of transistor 90. Diode 82 balances out the forward drop across diode 78.

Figure 2:
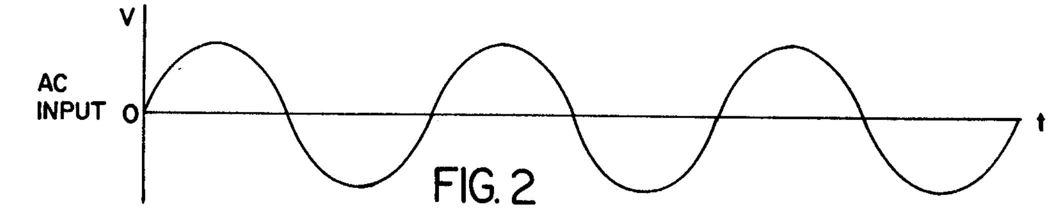
FIG. 2 represents the input signal applied to the electronic switch.
Figure 3:
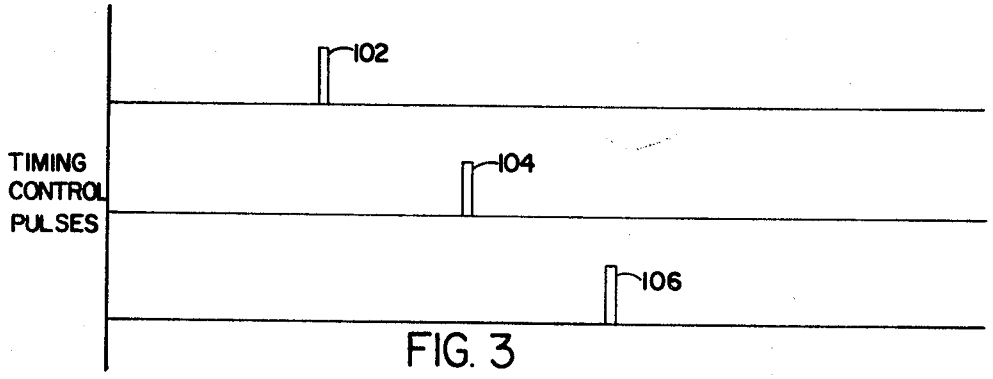
FIG. 3 shows the timing pulses used to control the switch and their relation to the input signal of FIG. 2.

To turn the switch on, transistor 52 is turned off and transistor 50 is turned on during a negative half cycle of the A-C input signal. In FIG. 3 a timing control pulse 102 is shown as occurring during a negative half cycle of the A-C input signal waveform shown in FIG. 2. Timing control pulse 102 is applied to an input line 103 of flip-flop 55 causing its state to be such that the signal generated on the SET line 54 of flip-flop 55 turns transistor 50 on and the signal on the CLEAR line 56 of flip-flop 55 turns transistor 52 off. At the time the transistors 50 and 52 are thus switched, the output at terminal 68 is being controlled by transistor 64 and the voltage at output terminal 68 is 10 volts D-C. After transistors 50 and 52 are switched such that transistor 50 is conducting and transistor 52 is cut off, the A-C input signal of source 14, superimposed on a 10 volt D-C level, is applied to junction A. When junction A, which is tied to the base of transistor 62, exceeds 10 volts, transistor 62 takes control starting a positive half cycle at the output terminal 68. In other words, transistor 62 begins conducting and transistor 64 is simultaneously back biased and cut off. During this positive half cycle, the base of transistor 64 is switched from a +10 volts D-C to ground potential by the action of transistor 90, and transistor 62 retains control thereafter. A timing control pulse 104 shown in FIG. 3 and occurring during a positive half cycle of the A-C input waveform of FIG. 2 is applied to an input line 93 of flip-flop 92 causing it to assume a state such that output line 91 has a signal generated thereon which causes transistor 90 to be conducting, placing junction 80 at ground potential 28. Placing junction 80 at ground potential obviously also places the base of transistor 64 at ground potential.

Transistor 62 then retains control until the switch is to be turned off. To turn off the switch, the base of transistor 64 is switched from ground potential to +10 volts D-C during a positive half cycle. Timing pulse 104 of FIG. 3 is applied to input line 93 of flip-flop 92 to change the state of flip-flop 92 such that the signal developed on its output line 91 causes transistor 90 to be cut off and nonconducting. Junction B then goes to +10 volts due to the action of the voltage divider comprising resistor 76 and diode 78, in conjunction with diode 82. Transistor 64 then assumes control when the signal at junction A falls below +10 volts. This occurs when the A-C component of the signal at junction A crosses the D-C level which is at +10 volts. After transistor 64 has taken control, the base of transistor 62, that is, junction point A, is switched to ground potential. This is accomplished by applying a timing control pulse 106, shown in FIG. 3, and occurring during a negative portion of the A-C input waveform shown in FIG. 2, to an input line 105 of flip-flop 55 causing it to change its state such that transistor 52 is conducting and transistor 50 is cut off. Conduction of transistor 52 places junction D and junction A at ground potential 28.

Figure 4:
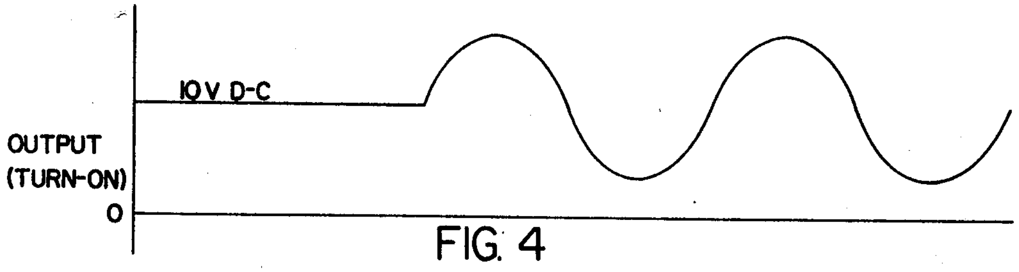
Figure 5:
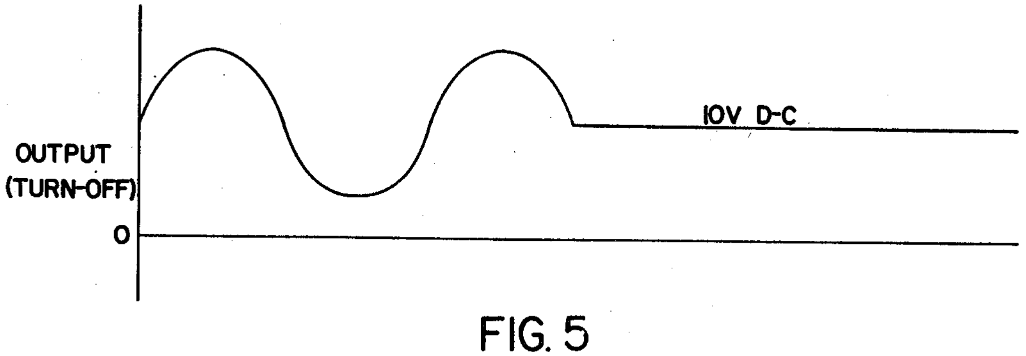
FIG. 5 shows the output waveform of the electronic switch when it is turned off.

The waveform shown in FIG. 4 shows the output signal at output terminal 68 at and during turn-on of the switch circuit. The waveform in FIG. 5 corresponds to the output signal at output terminal 68 during and at turn-off of the switching circuit.

In order to make the operation of the switch perfectly clear, a detailed example of the control of input junction A of switching means 60 will be presented. Junction 38 is at a D-C voltage of 10 volts. In general, the D-C voltage at junction 38 is one half of the voltage selected for D-C source 10 to allow maximum swing of the A-C input signal. For A-C input signals with relatively small swing, the ratio of source 12 to source 10 may be greater or less than one half. Superimposed on the D-C voltage of 10 volts at node 38 is an A-C voltage whose peak value is equal to or less than 10 volts or half of the voltage selected for source 10. When junction D is held at ground potential by transistor 52, diode 48 is back biased and diodes 32 and 34 are forward biased. The potential of junction C is then one diode drop above junction 38. Since junction D is at ground, input junction A is also at ground and the base-emitter junction of transistor 62 is back biased (since transistor 62 is conducting and its emitter is at about +10 volts). Resistors 30 and 36 along with diodes 32 and 34 provide a fixed load for transformer 42. When the voltages at junction C and junction D are interchanged due to the action or change of state of flip-flop 55, transfromer 42 still sees the same amount of load. In this second case, the load is comprised of resistor 46, diode 48, diode 34, and resistor 36. This load is the same as that provided by resistors 30 and 36 in combination with diodes 32 and 34. Therefore, the voltage at input junction A at the base of transistor 62 is the same as that at node 38. In other words, it is at 10 volts D-C with the A-C signal superimposed thereon.

Transistor 90 switches junction 80 between the collector-emitter saturation voltage of transistor 90 and +10 volts D-C plus one diode drop due to diode 78. Therefore, input junction B is switched between 10 volts D-C and ground. When the voltage at junction A is greater than the voltage at junction B, transistor 62 is conducting and transistor 64 is off. When the voltage at junction A is less than the voltage at junction B, transistor 20 is off and transistor 22 is conducting.

Diodes 34, 74, and 82 are used to compensate for other diode drops in the circuit, which are a function of temperature. The major advantage of this switch circuit is that voltage steps or spikes do not appear at the output terminal 68 during switching. This advantage is very important when driving capacitive loads. The diode compensation mentioned before and the low output impedance of the circuit due to the emitter-follower configuration of transistors 62 and 64 make the circuit useful in applications where high accuracy is required, such as in digital to analog conversion.

Although a specific embodiment is shown, it is obvious that many modifications and changes can be made without departing from the scope of the invention. For example devices other than flip-flops can be used in place of flip-flops 55 and 92. Furthermore, as mentioned before, the voltages selected for source 10 and 12 need not necessarily be as shown, that is, 20 volts and 10 volts respectively. It is only necessary that for maximum allowable swing of the A-C input signal the voltage of source 12 be selected to be one half of that of source 10. The scope of the invention is to be limited only by the following claims.

I claim:

1. Switch apparatus, comprising:

a source of fixed supply potential with respect to a reference potential;

a source of fixed bias potential with respect to the reference potential;

switching means having first and second signal input means and an output means and connected to the fixed supply potential;

means for maintaining the first signal input means at the reference potential and the second signal input means at the fixed bias potential, thereby closing the switching means between its second signal input means and output means, placing the output means essentially at the fixed bias potential, and opening the switching means between the first signal input means and the output means;

a source of variable potential comprising an alternating pontential superimposed upon the fixed bias potential;

means for applying the variable potential to the first signal input means at a time when the alternating potential is going through a first phase, closing the switching means between its first input means and output means and opening it between its second input means and output means when the variable potential becomes the same as the bias potential;

means for applying the reference potential to the second input means at a time when the alternating potential is going through a second phase and subsequently removing the reference potential from the second signal input means at a time when the alternating potential again goes through its second phase; and, means for removing the variable potential from the first signal input means at a time when the alternating potential goes through its first phase, the first signal input means then again being maintained at the reference potential.

2. The apparatus of claim 1 wherein the fixed supply potential is V volts D-C, the reference potential is zero volts, and the fixed bias potential is $V/2$ volts D-C.

3. The apparatus of claim 1 wherein the switching means has a first switching junction between the first signal input means and output means and a second switching junction between the second signal input means and output means.

4. The apparatus of claim 3 wherein the first and second switching junctions comprise the base-emitter junctions of first and second transistors, respectively.

5. The apparatus of claim 3 wherein the first and second signal input means are the base electrodes of the first and second transistors, respectively, the emitter electrodes are tied together and connected to the output means and the collectors are tied together and connected to the source of fixed potential.

6. The apparatus of claim 1 wherein the means for maintaining the first signal input means at the reference potential comprises a third transistor and a flip-flop, the third transistor connected to the first signal input means, reference potential, and flip-flop, the third transistor when conducting placing the first signal input means substantially at the reference potential and when nonconducting, placing the first signal input means at the fixed bias potential, the flip-flop, when in a predetermined one of two states, providing a drive signal to the third transistor causing it to saturate and thereby place the first signal input means substantially at the reference potential.

7. The apparatus of claim 1 wherein the means for applying the reference potential to the second signal input means comprises a fourth transistor and a second flip-flop, the transistor connected to the second signal input means, reference potential, and flip-flop, the fourth transistor, when conducting, causing the second signal input means to be at the reference potential, the flip-flop, when in a predetermined one of two states, providing a drive signal to the fourth transistor causing it to conduct and thereby place the second signal input means at the reference potential.

8. An electronic switch circuit comprising:

a first terminal for connection to a reference potential;

a first supply terminal for connection to a fixed D-C supply potential with respect to the reference potential;

a second supply terminal for connection to a fixed D-C bias potential with respect to the reference potential;

input means for connection to an A-C input signal;

output means;

switching means comprising first and second transistors each having collector emitter and base electrodes, the collector electrodes connected to the first supply terminal, the emitter electrodes connected to the output means and to the first terminal through a resistor;

means for biasing the base of the second transistor either at the reference potential or at the fixed bias potential;

means for biasing the base of the first transistor either at the reference potential or at the fixed bias potential with the A-C input signal superimposed thereon;

means for applying the fixed bias potential with the A-C signal superimposed thereon to the base electrode of the first transistor at a time when the A-C signal has a first predetermined phase;

means for applying the reference potential to the base electrode of the second transistor at a subsequent time when the superimposed A-C signal goes through a second predetermined phase;

means for rebiasing the base electrode of the second transistor to the fixed bias potential at a time when the superimposed A-C signal goes through the second predetermined phase; and means for rebiasing the base electrode of the first transistor to the reference potential at a subsequent time when the superimposed A-C signal goes through the first predetermined phase.

9. An electronic switch, comprising:

first and second transistors with their collectors and emitters tied together and in an emitter-follower configuration;

first means, associated with the second transistor, having first and second states, the base of the second transistor maintained at a forward bias potential in the first state and a reference potential in the second state; and second means, associated with the first transistor, having first and second states, the base of the first transistor maintained at the reference potential in the first state and having a variable potential applied to it in the second state, the variable potential being an A-C signal superimposed upon the bias potential, during a switching sequence the first and second means initially in their first states, the second means changing to its second state during a time when the A-C signal is in a first phase, the first means changing to its second state at a subsequent time when the A-C signal is in a second phase, the first means changing back to its first state at a subsequent time when the A-C signal is in its second phase, and the second means changing back to its first state at a subsequent time when the A-C signal is in its first phase.

References Cited

UNITED STATES PATENTS

| | | | |
|---|---|---|---|
| 2,668,910 | 2/1954 | Starr | 328—99 |
| 2,781,448 | 2/1957 | Struven | 328—98 |

STANLEY D. MILLER, Acting Primary Examiner

B. P. DAVIS, Assistant Examiner

U.S. Cl. X.R.

307—239, 247; 328—99